Patented Oct. 28, 1947

2,429,791

UNITED STATES PATENT OFFICE 2,429,791

2,2,4-TRICHLOROBUTYRAMIDE

Oscar W. Bauer and John W. Teter, Chicago, Ill., assignors to Sinclair Refining Company, New York, N. Y., a corporation of Maine No Drawing. Application October 12, 1944, Serial No. 558,481

1 Claim. (Cl. 260—561)

This invention relates to a new derivative of butyramide, namely 2,2,4-trichlorobutyramide.

The new compound of the invention is a crystalline white substance which is almost odorless and has but slight solubility in water. It is useful as an insecticide and insect repellent, and as an intermediate for the production of a wide range of other compounds, the chlorine atom in the 4-position being relatively labile and therefore serving as a means for the ready introduction of other groups into the molecule.

The new compound may be prepared by hydrolysis of the corresponding 2,2,4-trichlorobutyronitrile, which in turn may be produced by the liquid phase, light-activated, direct chlorination of butyronitrile. The hydrolysis is advantageously carried out with the use of cold concentrated sulfuric acid. The procedure readily gives the amide in good yields. The amide is recovered from the reaction product by breaking up the more or less solid product with cold water, and recovering the amide by filtration. The relatively small amount which remains in solution may be recovered by precipitating the sulfuric acid with lime and evaporating the filtrate under a vacuum. It may be purified by recrystallization from naphtha or other solvents, to give the product in the form of white crystals.

The invention will be illustrated by the following example, but it is not limited thereto:

Example.—2,2,4-trichlorobutyronitrile is mixed with cold concentrated sulfuric acid by adding the acid slowly to the nitrile with stirring. The mixture is kept cold for several days, and is then diluted with ice water. The bulk of the amide is then separated by filtration. That which remains in solution is recovered by precipitating the sulfuric acid by the addition of lime and removing the precipitate by filtration. The filter cake is reslurried twice more with water, with filtration each time, the filtrates combined and the water removed by evaporation under vacuum (100 mm.). The product obtained, after being recrystallized from naphtha, in one case had a melting point of 51.0–51.5° C. which was constant after four recrystallizations. The yield was about 64% of the theoretical.

We claim:
2,2,4-trichlorobutyramide.

OSCAR W. BAUER.
JOHN W. TETER.

REFERENCES CITED

The following references are of record in the file of this patent:

Sidgwick, "The Organic Compounds of Nitrogen," pp. 136, 137, 138, 139, 312, and 313 (1937).

Braun et al., "Ann. der Chem.," vol. 453, p. 136 (1927).

Matterer, "Monatshefte fur Chemie," vol. 4, p. 551 (1883).

Berthet, "Bull. Classe Sci. Acad. Roy. Belg.," vol. 27, pp. 212–228 (1941).

Judson, "Beilstein," 4th edition, vol. 2, p. 281 (1920).